2,805,681
Patented Sept. 10, 1957

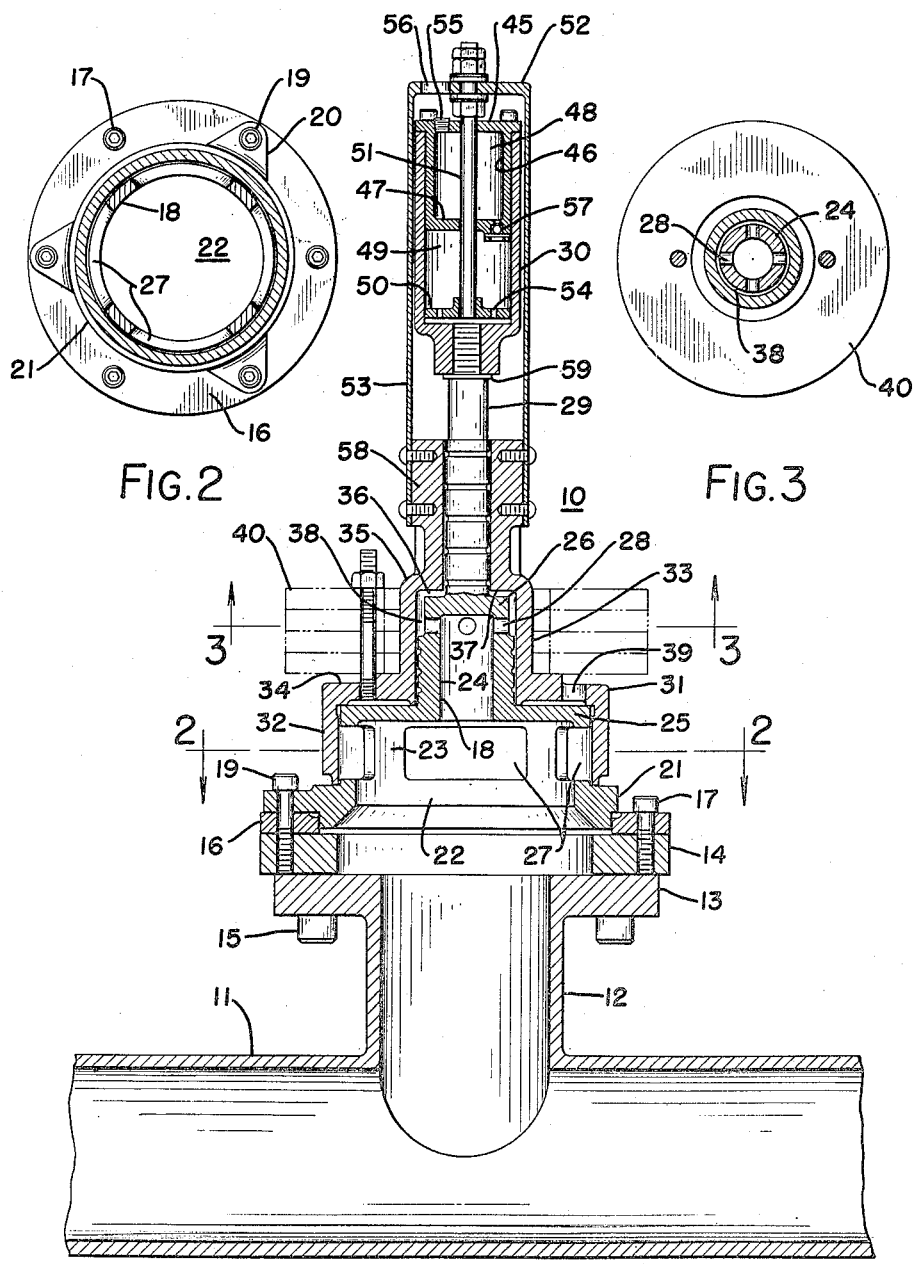

2,805,681
PRESSURE RELIEF VALVE

Alfred C. English, Forest Hills, N. Y., and Joseph E. Whitfield, Erie, Pa., assignors, by mesne assignments, to Ingersoll-Rand Company, New York, N. Y., a corporation of New Jersey Application March 18, 1952, Serial No. 277,168

1 Claim. (Cl. 137—503)

This invention relates to improvements in the construction of relief valves for relieving fluid pressure when the pressure reaches a predetermined value, and is especially applicable to the discharge pipe connection between a pressurizing device and a receiver.

An object of the invention is to provide a relief valve that will open and close at a predetermined static pressure and that is unaffected in either its closed or open position by the velocity pressure of the fluid to be controlled.

Another object is to provide a relief valve of the above type in which the effective lifting area of the valve exposed to the pressure of the fluid to be controlled is relatively small as compared with the area of the pressure relief port whereby the force required to control the opening and closing of the valve may be relatively small as compared to the lifting force of the volume of fluid unloaded by the valve.

Another object is to provide a relief valve of the above type in which the closing force applied to the valve throughout its movement is constant, as opposed to constructions employing springs which in accordance with Hookes law exert a force that is proportional to the amount of spring deflection.

Another object is to provide a relief valve of the above type having novel means for overcoming the effect of the inertia of the moving parts of the valve, whereby the reciprocating movement of the valve controlling the discharge opening effects a delaying action preventing chattering or undesirably rapid opening and closing of the valve.

Further objects and advantages of the invention will become apparent from the following description when read in connection with the accompanying drawings, in which:

Figure 1 is a view in vertical cross section of the novel valve shown in closed position;

Figure 2 is a sectional view taken on the line 2—2 of Figure 1 looking downwardly in the direction of the arrows; and Figure 3 is a sectional view taken on the line 3—3 of Figure 1 looking upwardly in the direction of the arrows; and Referring to the preferred form of the invention, as shown in Figures 1, 2 and 3, the novel relief valve 10 is shown as applied to a pipe line 11 through which flows fluid under pressure from a source (not shown), as for example, a blower as shown in United States Letters Patent No. 2,287,716, issued June 23, 1942, to a receiver (not shown).

The pressure fluid pipe line 11 is provided with an upwardly opening pressure relief outlet pipe 12 having at its upper end an outwardly projecting annular flange 13 on which is supported in vertical position, the novel pressure relief valve 10. In order to accommodate any one of a number of sizes of valves, a suitable adapter flange 14 is secured on the pipe flange 13, as by bolts 15 and an annular adapter ring 16 is seated on and secured to the adapter flange 14, as by cap screws 17.

The hollow cylindrical valve body 18 of relief valve 10 is seated on the adapter ring 16 and is secured thereon in suitable manner, as by cap screws 19 extending through ears 20 formed with and projecting outwardly of the annular base 21 of the valve body 18, and also extending through the adapter ring 16 into the adapter flange 14. The annular base 21 defines a pressure fluid inlet 22 to the valve body 18.

Rising from the base 21, the valve body 18 includes a lower cylindrical body portion 23 and an upper cylindrical body portion 24 having a smaller diameter than the lower body portion 23. The valve body 18, including its lower and upper portions 23 and 24, defines a chamber for receiving pressure fluid through its inlet 22. An annular horizontal wall 25 of the valve body 18 joins the upper edge of the lower body portion 23 with the lower edge of the upper body portion 24. The upper end of the valve body 18 is closed by the horizontal top wall 26.

The cylindrical wall of the lower body portion 23 is provided with a plurality of ports 27 through which, when the pressure relief valve is open, fluid under pressure will exhaust. The area of the ports 27 is preferably as great or greater than the area of the inlet 22, to permit rapid exhaust of a large volume of pressure fluid.

A plurality of laterally directed ports 28 are provided in the cylindrical wall of the upper body portion 24 near the upper end thereof just below the top wall 26. The ports 28 are comparatively small, and as is apparent upon referring to Figure 1, the cross sectional area of the ports 28 is many times smaller than the cross sectional area of the exhaust ports 27.

Projecting vertically upward from the top wall 26 of the valve body 18 is a stem 29 on the upper end of which is secured a cylinder 30. The structural features and the function of the cylinder 30 will be explained later in the description.

A cylindrical valve casing, designated as a whole by the reference character 31, telescopically embraces the valve body 18. The valve casing 31 includes a lower cylindrical portion or valve member 32 telescopically engaging the lower body portion 23 of the valve body 18. The valve member 32 seats on the base 21 of the valve body 18, and when so seated effects a closure for the pressure exhaust or relief ports 27.

The valve casing 31 also includes an upper cylindrical portion 33 telescopically engaging the upper body portion 24 of the valve body 18. An annular horizontal wall 34 joins the upper edge of the valve member 32 and the lower edge of the upper cylindrical portion 33 of the valve casing 31. At its upper end, the valve casing 31 is provided with an annular top wall 35 embracing the stem 29. The inner surface of the top wall 35 is arranged, when the valve casing 31 is seated, to provide a space 36 between it and the top wall 26 of the valve body 18. As hereinafter described, this inner surface of the top wall 35 forms a pressure responsive area or lifting face 37 for the valve casing 31. Extending upwardly from the top wall 35 is a sleeve 58 embracing and having a clearance fit with the stem 29.

The upper peripheral portion of the cylindrical body portion 24 above the ports 28 is recessed to provide an annular passage 38 leading from the ports 28 to the space 36 for passage of pressure fluid to the lifting face 37 of the valve casing 31.

Any pressure fluid leaking from the ports 27 between the valve body 18 and the valve casing 31 to the under side of the annular wall 34, escapes to atmosphere through a vent port 39 in the wall 34. This precludes accumulation of pressure against the under side of the wall 34 and prevents such pressure leakage from exerting a lifting force tending to raise the valve member 32 from its seat. Also any pressure fluid leaking from the ports 28 to the underside of the annular wall 34 is also vented to atmosphere through the vent port 39. It will be seen, therefore, that the effective lifting area of the valve casing 31 is confined to the area of the lifting face 37.

It is apparent that fluid pressure passing through the ports 28 into the passage 38 and thence into the space 36, acts against the lifting face 37 of the valve casing 31 to raise the valve member 32 from its seat and uncovers the relief or exhaust ports 27 whereby fluid pressure is exhausted to atmosphere. In order to provide for opening of the valve member 32 at any selected pressure, a plurality of weights 40 of annular form are provided and arranged to rest on the annular wall 34 of the valve casing 31. By proper selection of the number and size of the weights, the relief valve 10 can be arranged to open at any desired pressure. Also, since the effective lifting area 37 of the valve casing is small as compared to the area of the exhaust passage and ports, it is apparent that a large volume of pressure fluid can be exhausted with comparatively small weights 40.

Total pressure exerted by a fluid in motion is made up of two components, static pressure and velocity pressure. The velocity pressure is due to the momentum of the mass of fluid and the static pressure is due to the action of the molecules because of their internal energy. When the relief valve 10 is closed, as in Figure 1, it can only be affected by static pressure, since the velocity component of the pressure fluid passing through the pipe 11 has no effect in a direction perpendicular to the direction of flow therethrough. However, when the valve 10 opens, pressure fluid discharges through the outlet pipe 12 into the valve and of course has a velocity pressure component. Once the ordinary types of valves are opened, fluid flows in the direction of the valve lifting area and the total pressure is the result of the static pressure plus the velocity pressure. In the instant valve, since the ports 28 are directed laterally and isolate the lifting area 37 from movement of the fluid, the velocity pressure component is eliminated and the valve will open and close in response to static pressure only. The valve 10 can therefore be opened at any selected constant static pressure and it is unaffected by the velocity pressure of the fluid. If the velocity component is not isolated, it will be seen that the valve would open at a particular set static pressure but would close only when the total pressure (static plus velocity) dropped below the original set value.

It will also be observed that in the present valve a small lifting area, viz., the area of face 37 controls a large volume of flow through the relief ports 27. If the lifting area increased as the size of the relief outlet pipe 12 increased, the amount of weights required to hold the valve closed at any value of pressure would soon become impractical. The weights 40 holding the valve closed are small as compared to the lifting force of the pressure fluid controlled and this is an important feature.

In order to prevent undesirably rapid opening and closing or chattering of the valve, means for retarding the operation of the valve is provided, which will now be described. As previously stated, a cylinder 30 is secured on the upper end of the valve body stem 29. The open upper end of the cylinder 30 is provided with a removable tightly fitting cover 45 having a depending wall 46 extending downwardly into the cylinder 30 which supports a horizontal annular plate 47 dividing the cylinder 30 into an upper chamber 48 and a lower chamber 49.

The lower chamber 49 is filled with a suitable liquid, such as oil, and the upper chamber 48 is partially filled to provide a reservoir of oil for the lower chamber 49. Disposed in the lower chamber 49 is a piston 50 provided with a piston stem 51 extending upwardly through the plate 47 and cover 45. At its upper projecting end, the piston stem 51 is attached in suitable manner to the top wall 52 of a cage 53 that surrounds the cylinder 30 and is rigidly attached at its lower end to the sleeve 58 of the valve casing 31.

When the valve casing 31 is raised, in other words when the relief valve 10 is opened, the piston 50 travels upwardly in the lower chamber 49. The collar 59 forms a stop limiting the stroke or upward travel of the piston 50 and consequently limits the upward travel of the valve member 32. The collar 59 is disposed so that the stroke of the piston 50 permits the valve member 32 to completely uncover the pressure relief ports 27. The piston 50 is provided with a plurality of restricted openings 54 through which the oil in chamber 49 must pass on both the upward and downward strokes of the piston 50, whereby the opening and closing of the relief valve 10 is slowed or retarded.

The cover 45 is provided with a pipe plug 55 adapted to be removed through the opening 56 in the top wall 52 of the cage 53 in order to supply oil to the chamber 48. From the chamber 48, oil enters the chamber 49 through the normally open check valve 57 in the plate 47. On the up stroke of the piston 50, the check valve 57 closes and any oil forced upwardly through the clearance between the plate 47 and the piston stem 51 returns to the chamber 49 when the piston 50 descends and the check valve 57 opens. In this construction, as described, packing is eliminated and consequently friction between the relatively moving parts is negligible.

We claim:

A pressure relief valve comprising a valve body having a communicating lower and upper chamber defined respectively by upright coaxial cylindrical walls, the upper of said cylindrical walls having a substantially smaller diameter than said lower cylindrical wall, an annular horizontal wall connecting the upper and lower peripheral edges, respectively, of said lower and upper cylindrical walls, a top wall closing the uper end of said upper cylindrical wall, the lower end of said lower cylindrical wall being open to form a pressure fluid intake port, said lower cylindrical wall being provided with openings to form exhaust ports, a valve member having upper and lower cylindrical walls in telescopic relation with the upper and lower cylindrical walls of said valve body, having an annular horizontal wall connecting the upper and lower peripheral edges, respectively, of said lower and upper cylindrical walls of said valve member and overlying the said annular horizontal wall of said valve body, the upper end of the upper cylindrical wall of said valve member having a horizontal wall forming a working surface in overlying spaced relation with the top wall of the upper cylindrical valve body wall, the upper cylindrical valve body wall having therein laterally directed port means, a passage between said upper cylindrical valve body and valve member walls providing communication between said laterally directed port means and the said working surface of said valve member for delivering pressure fluid to the said working surface to raise said valve member to expose the exhaust port in the lower cylindrical valve body wall, and a vent port extending through the said annular horizontal wall of said valve member for venting to atmosphere pressure fluid leakage to said annular horizontal wall through the clearances between the telescoping walls of said valve body and valve member to prevent said pressure fluid leakage from exerting a lifting force against said annular horizontal wall and thereby against said valve member.

References Cited in the file of this patent

UNITED STATES PATENTS

| | | |
|---|---|---|
| 694,811 | Whiting | Mar. 4, 1902 |
| 1,087,906 | Houghton | Feb. 17, 1914 |
| 1,290,430 | Wainwright | Jan. 7, 1919 |
| 1,850,117 | McMillan | Mar. 22, 1932 |
| 1,860,756 | Waninger | May 31, 1932 |
| 1,893,187 | Urbanek et al. | Jan. 3, 1933 |
| 1,994,958 | Moffett | Mar. 19, 1935 |
| 2,087,037 | McCarthy | July 13, 1937 |